United States Patent [19]

Burg

[11] Patent Number: 5,273,127
[45] Date of Patent: Dec. 28, 1993

[54] AIR CUSHION VEHICLE RIDE CONTROL SYSTEM

[76] Inventor: Donald E. Burg, 15840 SW. 84th Ave., Miami, Fla. 33157

[21] Appl. No.: 686,742

[22] Filed: Apr. 16, 1991

Related U.S. Application Data

[63] Continuation-in-part of Ser. No. 475,708, Feb. 6, 1990, Pat. No. 5,181,580.

[51] Int. Cl.$^5$ .............................. B60V 1/00; B60V 1/11
[52] U.S. Cl. ................................... 180/116; 180/117; 181/114; 181/116
[58] Field of Search ..................... 180/116, 117, 126; 114/67 A; 181/114, 116, 119

[56] References Cited

U.S. PATENT DOCUMENTS 3,854,547 12/1974 Hall ..................................... 180/117

FOREIGN PATENT DOCUMENTS 980570 1/1965 United Kingdom ................ 180/117

Primary Examiner—Mitchell J. Hill
Attorney, Agent, or Firm—Robert J. Van Der Wall

[57] ABSTRACT

A simple and low maintenance Ride Control System (RCS) for Air Cushion Vehicles (ACV) is presented. This RCS reduces the effect of water wave generated pressure pulses on ACV ride by venting the pressure pulses from the pressurized supporting gas cushion and/or restricting gas flow into a powered blower that supplies the pressurized supporting gas cushion as the pressure pulses occur. The preferred embodiment utilizes high aspect ratio low moment of inertia vanes that are individually driven by brushless electric servo motors and the vanes can rotate in either direction through 360 degrees. A vane braking and locking mechanism is presented that brakes and locks the vanes in a closed position in the event of power failure to the vane drive motors. A further feature of the invention is a venturi that is positioned between the powered blower and the pressurized supporting gas cushion to reduce the effect of the pressure pulses on blower operation. Control of the vanes is normally directed by a controller that takes inputs from a pressure transducer that monitors pressurized supporting gas cushion pressures and analyzes same to come up with vane operational directions.

40 Claims, 2 Drawing Sheets

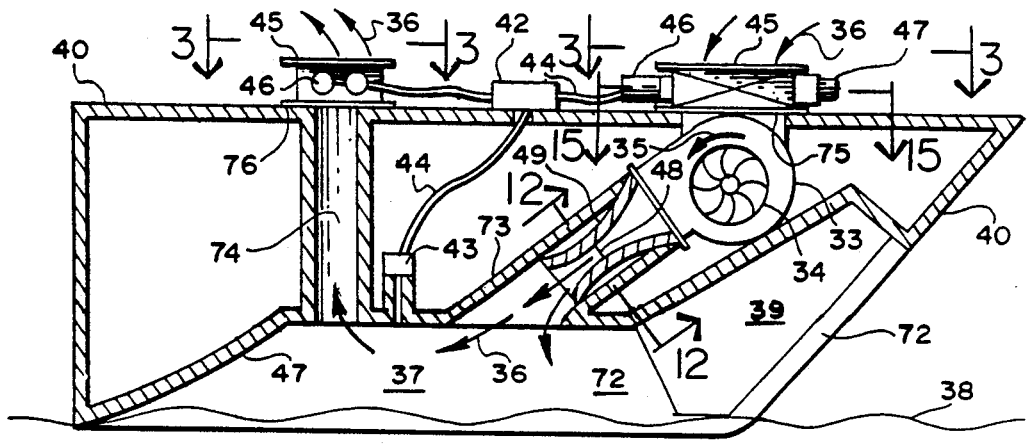
FIG.1
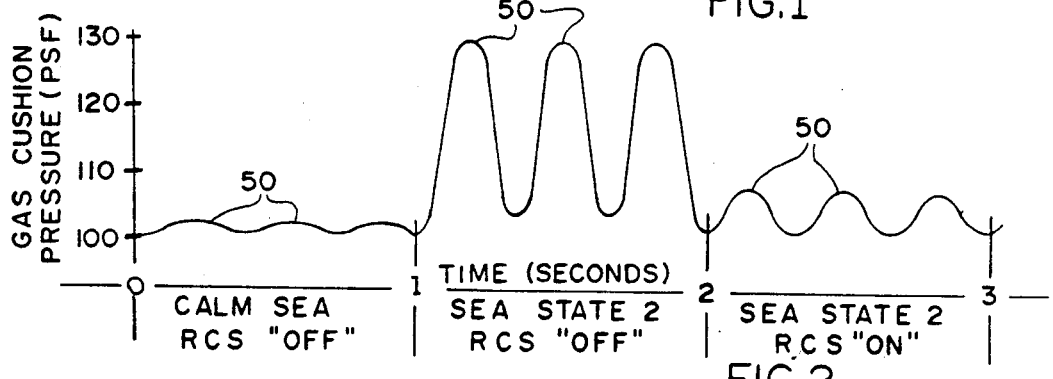
FIG.2
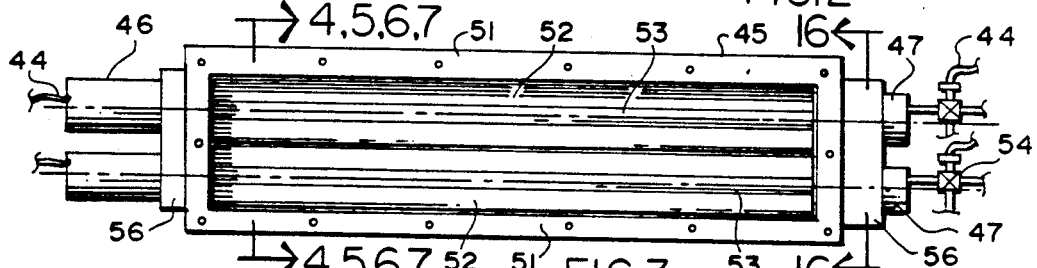
FIG.3
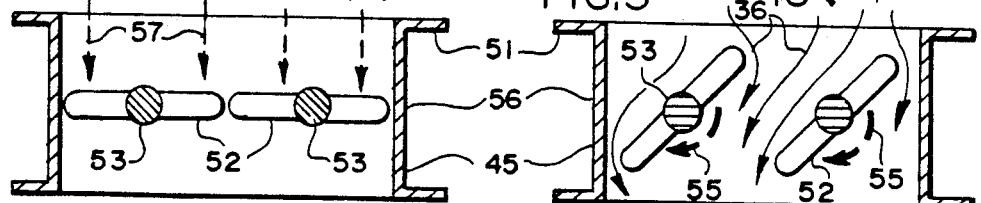
FIG.4  FIG.5
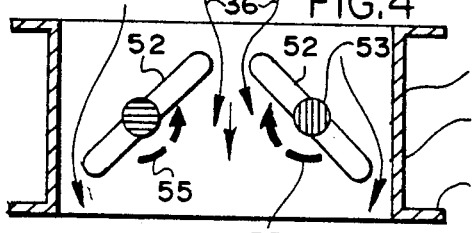 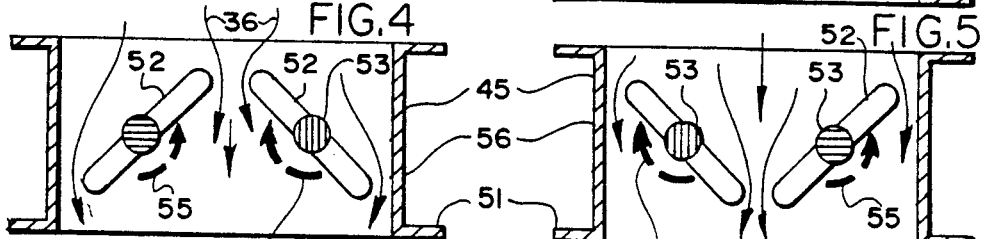
FIG.6  FIG.7

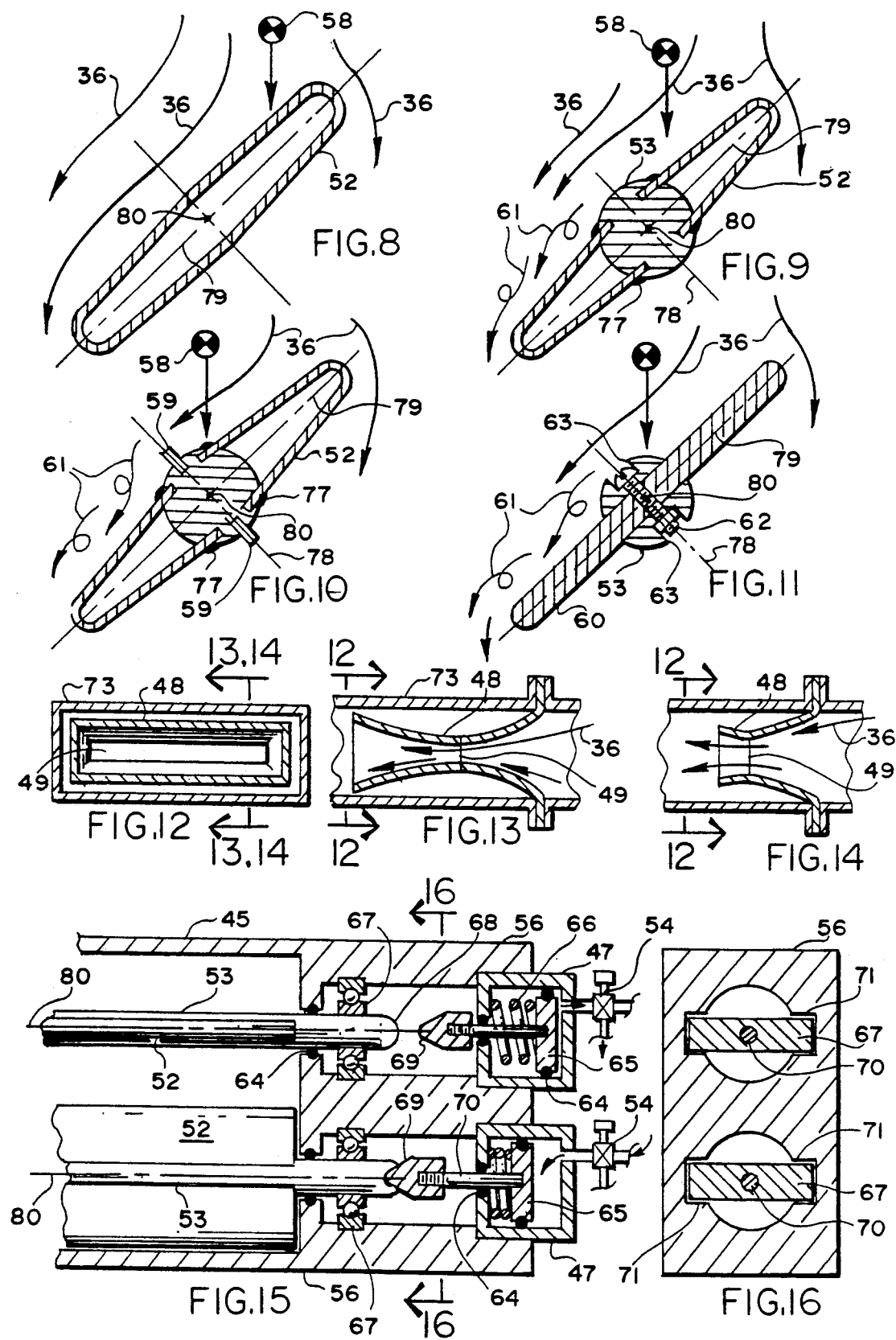

AIR CUSHION VEHICLE RIDE CONTROL SYSTEM

CROSS REFERENCE TO OTHER APPLICATIONS

This application is a continuation-in-part to applicant's earlier application, Ser. No. 475,708 filed Feb. 6, 1990 issued on Jan. 26, 1993 as U.S. Pat. No. 5,181,580.

BACKGROUND OF THE INVENTION

The instant invention offers a simple very high speed valve system for controlling the ride qualities of air cushion vehicles. In particular, it is applicable to air cushion marine vehicles such as my Air Ride boat inventions. The air cushion vehicle is supported mostly by a pressurized air cushion located in its underside where the air cushion is supplied with pressurized gas from a gas pressurization device such as a powered blower. Latest Air Ride inventions are best represented by U.S. Pat. Nos. 4,739,719 and 5,000,107.

Practical applications of the Air Cushion Vehicle (ACV) technology such as Air Ride brought out the need for means to reduce pressure pulses that occur in the ACV's pressurized supporting air or gas cushion. Since the pressurized supporting gas cushion is essentially a large gas spring that generally supports some 85 percent or more of vehicle weight it is easy to see that sharp pressure pulses in the gas cushion can result in a rather harsh and bumpy ride in the vehicle.

The pressure pulses originate from water surface waves that pass into the gas cushion when the ACV is underway. The ACV generally has a flexible bow seal which allows the waves to enter the gas cushion relatively unmolested. Even very small surface waves can contribute to the problem with the pressure pulses rising over time in some instances. One reason for this is that the gas pressurization system, generally a powered blower, responds to small changes in cushion pressure and by so doing actually aggravates the situation. To understand how this works, consider that the blower moves toward a higher pressure when the pressure peak is rising and then goes toward a lower pressure when the pressure peak is falling. This is all well and good in theory; however, the blower response is lagging the pressure pulse rise and fall in pressure so the blower is actually contributing to the magnitude of the pressure pulses that the hull is feeling.

One approach to improve things is to utilize large diameter blowers that have flatter pressure vs. flow curves and lower rotational speeds. This helps in two ways: first, the flatter curve dictates that the blower will respond less to changes in pressure and second, the larger diameter blower wheel with its lower rotational speed means that the blower will take longer to change rotational speeds in response to pressure pulses.

When it is realized that typical pressure pulses occur at the rate of 2-3 cycles per second and that they are sharp and spike like in characteristic it is easy to understand the need to very carefully select the proper blower for an ACV. The total life of a typical pressure spike in an ACV can be on the order of 100 to 200 milliseconds. The maximum overpressure that occurs during that time varies but a pressure of 150 percent of normal or steady state gas cushion pressure is not uncommon. So, proper selection and design of the blower is essential to reduce the effects of pressure pulses on ACV ride qualities. However, even best selection of the blower still leaves a considerable amount of ride bounce due to the water surface generated gas cushion pressure pulses and the best blower still responds to pressure pulses but just to a lesser extent than a poorly selected blower.

The U.S. Navy has funded work to resolve the bouncy ride problem in their ACV's with particular emphasis on their Surface Effect Ships (SES) variants which are more complicated but similar in concept to my Air Ride boat inventions. The resulting solution is in the form of a Ride Control System (RCS) that is commercially manufactured in the United States. This RCS senses air cushion pressures and other hull operating characteristics and feeds such information into a microprocessor controller. The controller processes the input data and then outputs operating conditions to gas cushion vent valves and/or blower inlet flow control valves.

The gas cushion vent valves are operated in such manner so as to open and thereby vent pressure peaks as they occur in the supporting gas cushion. The blower inlet flow control valves accomplish essentially the same thing; however, they do so by restricting blower flow and pressure outputs in time with the pressure peaks. The commercially available RCS utilizes valves that are made up of a series of Venetian blind type overlapping louvers that are set in a rectangular frame. The louvers can be closed to essentially shut off gas flow or operated at various degrees of openness at frequencies that coincide with the pressure pulsing frequency in the supporting gas cushion.

This commercially available RCS utilizes a powered hydraulic cylinder to operate several vanes that are interconnected by mechanical linkages. Due to its inherent design characteristics, the two to six cycle per second hydraulically powered system in all probability requires high maintenance. It is easy to realize the difficult requirements put on this design when one considers that a typical SES ferry will see about forty million actuations of a single RCS vane per year. It has been reported that a RCS is now also manufactured in Sweden.

My instant invention utilizes special concepts in the vanes themselves to insure light weight construction and low moments of inertia. The low moment of inertia vane concept is combined with a way to create turbulence in the gas flow over the vane thus yielding balanced gas loading forces on the vane when operating. The two just discussed concepts that lower vane rotational force requirements are instrumental in allowing the present invention, in its preferred embodiment, to incorporate brushless electric servo motors each driving an individual vane. This approach eliminates hydraulic sealing problems and linkage wear and insures maximum vane drive system life. Further improvements include a fail safe vane braking and locking system that comes into play in the event of power failure and a venturi in the blower discharge to act as a check valve for the pressurized supporting gas cushion pressure peaks and thereby reduce the ability of the pressure peaks to reach the blower. Therefore, this venturi dramatically reduces the effects of gas cushion pressure peaks on blower operation. The features and improvements offered by the instant invention are discussed in the following sections.

SUMMARY OF THE INVENTION

A major object of the instant invention is to offer a simple and reliable Ride Control System (RCS) that greatly reduces the effects of water wave generated pressure pulses in Air Cushion Vehicles (ACV).

It is an object of the invention that the RCS utilize one or more valves to vent water wave generated pressure pulses from the ACV pressurized supporting gas cushion and/or restrict gas flow to the gas pressurization device as the water wave generated pressure pulses are occuring. In such manner the vanes control gas flow from and/or to the supporting gas cushion.

It is a related object of the invention that a pressure transducer that responds to pressurized supporting gas cushion pressures and outputs an electrical signal proportional to gas cushion pressures to a controller.

It is a further related object of the invention that the controller takes the first derivative of the pressure signal by use of a differentiator circuit and uses the output of the differentiator circuit, a signal that is proportional to the rate of change of pressure in the supporting gas cushion, as a signal to base control of positioning of the vane(s) that control flow from and/or to the supporting gas cushion.

It is an object of the instant invention that the RCS valves be mounted in RCS valve assemblies, generally flanged for easy removal, that mount in or to ducts that connects the pressurized gas cushion to the atmosphere and/or that supply gas to the gas pressurization device.

It is an optional object of the instant invention that the RCS valves be individually driven.

A related object of the invention is that vane drive motors be electrical.

A further related object of the invention is that the electrical vane drive motors be brushless to insure maximum life.

Another object of the invention is that the vanes be designed to have a low moment of inertia to minimize drive motor power requirements.

An object of the invention associated with the just mentioned low moment of inertia vanes is to make the vanes of strong light gage and hence light weight material.

It is a related object of the invention that the vane and shaft assembly be welded or otherwise solidly fixed together with the vane elements, generally U-shaped, positioned either side of the vane shaft.

An optional object of the invention is to offer a simple vane that pierces the vane shaft and is affixed to the vane shaft by fasteners, welding, or other means.

A further object of the invention is to utilize high aspect ratio vanes, where aspect ratio is defined as vane longitudinal length over vane chord, to minimize rotational torque forces on the vane and hence its drive motor(s).

A related object of the invention is that the light weight vanes be attached to and substantially equally distributed either side of major torque carrying center shaft to minimize unequal pressure generated torque loadings on the shaft and hence the drive motor(s).

It is further intended that a means to generate turbulence in the flow of gasses over the upstream side of the vane be incorporated to help equalize pressure forces over the vane and hence minimize vane torque requirements to drive the vane.

It is also intended that any valves or portions thereof, such as drive motors, will be easy to get to for servicing.

A related object of the invention is to place the drive motors outside of the gas flow path in a relatively clean environment since the gas flow path can contain water spray.

Further, it is an object of the invention that the vanes be easily removed from a flanged vane assembly with the flanged vane assembly still in place mounted to a duct in the ACV.

It is also intended as an object of the invention that any valve so described herein can have its elements positioned such that an essentially blocked flow or shutoff condition can be realized.

A further and somewhat related object of the invention is to have a fail safe vane braking and locking mechanism that instantly comes into operation in the event of power failure to the vane drive motor. When in the locked or shutoff position, the vanes essentially block flow and shutoff the valve(s) for vanes downstream of the gas cushion and open fully for maximum flow for vanes upstream of the gas pressurization device.

It is a related object of the invention that the fail safe vane braking and locking mechanism include a spring hold off pneumatic cylinder.

An important optional object of the invention is to have a full or partial venturi between the gas pressurization source and the supporting gas cushion to minimize the feedback of pressure pulses to the gas pressurization source where the gas pressurization source is generally a powered blower.

The invention will be better understood upon reference to the drawings and detailed description of the invention which follow in which:

BRIEF DESCRIPTION OF THE DRAWINGS

FIG. 1 presents a cross sectional view of a typical Air Cushion Vehicle (ACV), in this case an Air Ride Surface Effect Ship (SES) which is essentially a catamaran sidehull craft with a flexible bow seal at the forward end of and a fixed seal at the aft end of the supporting gas cushion. A powered blower is used as the gas pressurization source in this instance. Shown are inlet and outlet Ride Control System (RCS) valves, pressure transducer, controller, and a venturi in the blower discharge.

FIG. 2 presents typical supporting gas cushion water wave generated pressure pulses vs. time. It can be seen that the calm sea condition has little variation in pressures, sea state 2 with RCS "off" exhibits three pressure pulses per second at about thirty percent overpressure during the pulses, and sea state 2 exhibits the same three pressure pulses per second but at only about a ten percent overpressure with the RCS "on".

FIG. 3 shows a RCS valve assembly to the instant invention in a view taken through line 3—3 of FIG. 1.

FIG. 4 presents a cross sectional view of the valve assembly, as taken through line 4—4 of FIG. 3, that shows two RCS vanes in a closed position thus blocking flow.

FIG. 5 illustrates a cross sectional view of the valve assembly, as taken through line 5—5 of FIG. 3, that shows gas flow arrows with both RCS vanes rotated in the same direction.

FIG. 6 is another cross sectional view of the valve assembly, as taken through line 6—6 of FIG. 3, that shows the vanes with their nearest tips rotated upwardly.

FIG. 7 presents yet another cross sectional view, as taken through line 7—7 of FIG. 3, that shows valve positioning and gas flow direction arrows with the nearest tips of the vanes rotated downwardly.

FIG. 8 presents a cross section of a simple vane when rotated to 45 degrees. It is to be noted that in such instance the center of pressure resultant force arrow is proximal the upper tip of the vane thus resulting in a torque that the drive motor must overcome.

FIG. 9 presents a cross sectional view of a preferred vane, also when rotated to 45 degrees, that shows that a vane shaft has generated a turbulent flow condition on the upper downstream side of the vane shaft. This turbulence results in a higher static on the lower part of the upper surface of the vane than the example given in FIG. 8 and as a result moves the pressure resultant force arrow inboard and reduces the torque that the drive motor must overcome.

FIG. 10 is a cross sectional view of another preferred embodiment that has a flow spoiler installed on the shaft to help generate the turbulence discussed in FIG. 9.

FIG. 11 presents yet another option that is simpler in concept than those presented in FIGS 9 and 10. In this variation, the shaft has been cut for passage of a vane and the vane is affixed to the shaft by a fastener. Note that a slot is provided on each side of the shaft where such slot aids in generation of turbulence.

FIG. 12 presents a cross sectional view, as taken through line 12—12 of FIG. 1, of a venturi installed in a gas pressurization device, a powered blower in this case, discharge duct. This venturi aids in preventing wave generated pressure pulses in the pressurized gas cushion from reaching the blower. Note that the venturi shown is essentially simple and 2-dimensional as would best be utilized in a rectangular duct.

FIG. 13 is a cross sectional view, as taken through line 13—13 of FIG. 12, that shows a cross section of a venturi with a long shallow diverge angle discharge downstream of the venturi throat. This is the most efficient venturi configuration.

FIG. 14 shows a cross sectional view, as taken through line 14—14 of FIG. 12, that illustrates a shorter version of the venturi where at least most of the low discharge angle discharge section has been eliminated. This actually could be classified as a nozzle; however, for purposes of this application it is called a venturi since a nozzle is actually only a venturi with the diverging downstream section eliminated anyway.

FIG. 15 presents a centerline cross sectional view, as taken through line 15—15 of FIG. 1, that shows workings of the vane braking and locking mechanism. Note that the upper vane braking and locking mechanism is "off" and the lower vane braking and locking mechanism is "on" in this illustration.

FIG. 16 is a cross sectional view, as taken through line 16—16 of FIG. 15, that shows portions of the vane braking and locking mechanism's anti-rotation concept.

DETAILED DESCRIPTION

With reference to each of the aforementioned Figures in turn, and using like numerals to designate similar parts throughout the several views, a preferred embodiment and several alternative embodiments will now be described.

FIG. 1 discloses a cross sectional view of an Air Cushion Vehicle (ACV) hull 40, which in this case is an Air Ride Surface Effect Ship (SES) hull that is riding on wavy sea surface 38. The ACV hull 40 has means to maintain gas pressure in the pressurized supporting gas cushion 37 which include: catamaran like sidehulls 72, a forward movable or flexible seal 39, and a rigid structural bow shaped stern seal 41. The pressurized supporting gas cushion 37 is supplied by a gas pressurization device 33, in this case a powered blower 33. The blower 33 has a gas accelerating impeller 34 that rotates per rotation arrow 35. The blower discharge gas indicated by gas flow arrows 36 flows through a venturi 48 throat 49 with the venturi 48 normally positioned at least partially inside of duct 73.

The instant invention Ride Control System (RCS) valve assemblies 45 are shown positioned on the blower 33 inlet flange and the pressurized supporting gas cushion 37 discharge duct 74 flange 76. Shown on the RCS valve assemblies 45 are vane drive motors 46 and vane braking and locking mechanisms 47. Operation of the RCS valve assemblies 45 is directed by a controller 42 that receives electrical signals proportional to supporting gas cushion 37 pressures. The controller 42 takes the first derivative of the pressure signal by use of a differentiator circuit and uses the output of the differentiator circuit, a signal that is proportional to the rate of change of pressure in the supporting gas cushion 37, as a signal to base control of positioning of the vanes, vanes are shown in following Figures, in the RCS valve assemblies 45.

In the case where the RCS valve assembly 45 is installed in a vent duct 74 that leads from the supporting pressurized gas cushion 37 to the atmosphere, as the supporting pressurized gas cushion 37 pressure begins to increase, the vanes open. When the pressure begins to fall, the RCS valve assemblies 45 vanes at least partially close to retain pressure. Use of the first derivative of the pressure allows the RCS to anticipate changes in pressurized gas cushion 37 pressures and thus position the vanes in the RCS valve assemblies properly in a timely manner. This procedure vents the pressurized gas cushion 37 and/or restricts flow to the blower 33 as required. Finally, in addition to the control of the RCS valve assembly 45 vanes by the rate of change of pressurized supporting gas cushion 37 pressure, the RCS valve assemblies 45 vanes can be controlled directly by use of a microprocessor interface in the controller 42. This procedure allows the RCS controller 42 to initialize, rotate, bias, and shut the RCS valve assemblies 45 under operator control. Also shown in FIG. 1 are the interconnecting cables 44 that connect the pressure transducer 43, controller 42, and valve assembly 45 vane drive motors 46.

FIG. 2 shows typical ACV supporting gas cushion water wave generated pressure pulses 50 vs. time in seconds. In this instance it can be seen that the first second of operation is in a calm sea condition and the pressure pulses 50 are more or less cyclical but of low amplitude. The second second of operation shows an ACV with the RCS "off" when operating in sea state 2 and in such condition the pressure pulses 50 are approximately 30 percent higher than the lowest or average steady state pressure. The third second of operation shows the effect of having a RCS "on" where pressure pulses 50 are only about ten percent higher than the normal gas cushion pressure values.

FIG. 3 presents a view, as taken through lines 3—3 of FIG. 1, of a complete RCS valve assembly 45 to a preferred embodiment of the instant invention. Shown are the vanes 52, optional vane center shaft 53, mounting flange 51, housing 56, vane drive motors 46, vane braking and locking cylinders 47, and vane braking and locking cylinder control valves 54. In this instance, the vanes 52 are in the closed position and little or no gas flow could pass. It is to be noted that, after disconnecting the vane braking and locking cylinder 47, the instant invention RCS vane assemblies 45 have been made so that an entire vane 52 and drive motor 46 can be removed as an assembly while leaving the vane housing assembly 45 still mounted in a duct in a hull. This latter feature is very valuable for ease of maintenance.

It is to be noted that high aspect ratio vanes 52 are an important part of this concept in order to reduce vane moment of inertia values and thus keep drive motor 46 power requirements low. This can be easily realized when consideration is given to the fact that vane moment of inertia is the product of the vane weight times its radius of gyration squared. That is why a solid small radius shaft is used for strength while the larger radius vanes themselves are made of very lightweight material. Further to these definitions, vane aspect ratio is defined as the ratio of vane longitudinal length over vane chord. As an example of the high aspect ratio of these vanes, consider that applicant's present RCS uses vanes that are approximately 48 inches long and have a chord of six inches—that yields a vane aspect ratio of 48/6=8. For purposes of this application, a high aspect ratio vane is considered to be any vane with an aspect ratio greater than two. Construction of these vanes consists of a one inch diameter type 316 stainless steel center shaft with vane elements located either side that are made of lightweight 0.030 inches thick type 316 stainless steel. The vanes are welded full length to the shaft to insure structural integrity and prevent leakage of sea water into the hollow vane portions.

FIG. 4 presents a cross sectional view, as taken through line 4—4 of FIG. 3, that shows two vanes 52 and vane shafts 52 mounted in housing 56 that includes mounting flanges 51. In this instance the vanes 52 are closed thus restricting flow through the vane assembly 45. Static pressure force arrows 57 show the forces that would be applied against the vanes 52 in this closed positioning of the vanes 52.

FIG. 5 yields a cross sectional view, as taken through line 5—5 of FIG. 3, that shows both vanes 52 rotated in the same manner. The direction of vane shaft 53 rotation is indicated by shaft rotation arrows 55. This is not the preferred means of rotating the vanes 52 when opening same as there is an interference of gas flow, as can be seen by examination of gas flow arrows 36, which results in a reduction in gas flow volume and, importantly, uneven pressure loadings on the two vanes 52.

FIG. 6 presents yet another view of the vane assembly 45, as taken through line 6—6 of FIG. 3, that shows a more uniform flow pattern as indicated by flow arrows 36. In this case, the vane shafts 53 are rotated, as shown by rotation arrows 55, so that the nearest ends of the vanes 52 are rotated upwardly and uniform areas are presented between the vanes 52 themselves and between the vanes 52 and the housing 56.

FIG. 7 is another view of the vane assembly 45, as taken through line 7—7 of FIG. 3, that shows a similar situation to that presented in FIG. 6 but with the vanes rotated, as shown by vane rotation arrows 55, so that the nearest ends of the vanes 52 are rotated downwardly and uniform areas are presented between the vanes 52 themselves and between the vanes 52 and the housing 56. It is to be noted that the rotation arrangements of FIG's 6 and 7 give the best and most even dynamic pressure loadings on the vanes 52.

FIG. 8 presents a cross sectional view of a single vane 52 that is smooth and continuous in shape on its outside surface. This vane 52 is shown rotated at 45 degrees to the flow for illustrative purposes. While this shape offers a smooth fluid flow as shown by fluid flow arrows 36 over the vane's outer surfaces, it results in a resultant dynamic pressure force or center of pressure 58 that is displaced from the vane rotational centerline 80. This is because the gas flow traveling the longest distance over the downwardly extending upper or upstream side of the vane 52 has a higher speed and hence a higher dynamic pressure and a lower static pressure. The result is a higher torque requirement to drive the vane 52 and a slower vane 52 speed for a given drive motor size.

FIG. 9 presents a cross sectional view of another vane 52 that is also oriented to 45 degrees to the flow. In this case, the vane is welded, shown by welds 77, or otherwise attached to a vane shaft 53 where the vane shaft 53 extends higher than the vane on either side in the longitudinal centerline plane 78 of the vane 52. The chord centerline plane of the vane 79 is also shown. The higher extension of the shaft 53 on either side of the vane 52 produces a turbulence and slowing down of the flow over the top side of the vane 52 as can be seen by examination of the standard flow arrows 36 and the turbulent flow arrows 61. This slowing down of the fluid velocity over the turbulent flow portion of the vane 52 results in an increase in static pressure in the portion of the vane 52 to the left of the longitudinal centerline 78. The result is a shifting of the location of the center of pressure 58 to a position closer to the vane rotational centerline 80 and a decrease in the torque requirements to rotate the vane 52. The result of this preferred embodiment of the invention is a structurally sound vane 52 and shaft 53 concept combined with a reduction in vane 52 torque requirements.

FIG. 10 presents a cross sectional view of a vane 52 that is very similar in concept the that presented in FIG. 9 so the same discussion applies except there is the added feature of a special turbulence generator 59 which in this case is a simple thin plate that extends outward from the shaft 53. The use of this turbulence generator 59 is obviously very effective in generating turbulence and results in an even more favorable displacement of the center of pressure 58 toward the rotational centerline 80. Other types of turbulence generators such as a notch in the shaft, not shown, can obviously be utilized. Also shown in FIG. 10 are the vane chord centerline 79, vane/shaft welds 77, vane longitudinal centerline 78, fluid flow arrows 36, and turbulent fluid flow arrows 61.

FIG. 11 illustrates a cross sectional view of another variation that utilizes a simple vane 60, preferably solid and one piece, that pierces the vane shaft 53. This is a simpler and less expensive alternative vane concept although not quite as structurally sound as those presented in FIG.'s 9 and 10. The solid vane 60 can be affixed to the shaft 53 by fasteners 62 or other means, not shown. Notchs 63 can be cut down the entire length of both sides of the shaft 53 that serve the double duty of recessing fasteners 62 and acting as turbulence generators. Also shown in FIG. 11 are the vane rotational centerline 80, vane chord centerline 79, vane longitudinal centerline 78, fluid flow arrows 36, turbulent fluid flow arrows 61, and center of pressure 58.

FIG. 12 presents a cross sectional view, as taken through line 12—12 of FIG.'s 1, 13, and 14 that shows a venturi 48 located in the blower discharge. In this example, it is disposed inside a blower discharge duct 73. The venturi throat 49 is also shown. The use of a venturi 48 or similar flow restricting means downstream of the blower is a very valuable concept as it restricts the passing of pressurized gas cushion pressure pulses back to the blower.

FIG. 13 is a cross sectional view, as taken through line 13—13 of FIG. 12, of the blower discharge venturi 48. This view shows the venturi throat 49, gas flow arrows 36, and blower discharge housing 73. Note that the venturi 48 does not have to be positioned inside of the blower discharge duct 73 directly and could extend into the pressurized supporting gas cushion or be otherwise disposed. It is only necessary that the venturi 48 be positioned to pass most of the flow going from the blower to the pressurized supporting gas cushion. It is very desirable to utilize a 2-dimensional venturi 48 as such a venturi 48 can be easily constructed and easily installed in a rectangular duct 73.

FIG. 14 presents a cross sectional view, as taken through line 14—14 of FIG. 12, that shows a venturi 48 that has at least most of its diverging section downstream of the venturi throat 49 eliminated to shorten the overall length of the venturi 48. This actually could be classified as a nozzle; however, a nozzle is really only a venturi with the diverging section deleted. Therefore, the use of the term venturi is used throughout this application to cover either a pure venturi such as illustrated in FIG. 13 or a truncated venturi such as shown in FIG. 14. Either would be utilized downstream of the blower to reduce the passage of pressure pulses in the supporting pressurized gas cushion back to the blower. Also shown in FIG. 14 are gas flow arrows 36 and blower discharge duct 73.

FIG. 15 presents a partial cross sectional view, as taken through line 15—15 of FIG. 1, that shows workings of the vane shaft 53 and its vane 52 braking and locking mechanism. Shown are the shaft stopping and locking cam or wedge 69, mating cross slot in vane shaft 68, fluid cylinder 47, piston return spring 66, fluid control valve 54, piston 65, piston shaft 70, vane shaft bearings 67, and seals 64. While the preferred prime mover is a pneumatic cylinder 47 other force actuator such as electric motors can be used.

The upper vane shaft 53 is shown with the brake unlocked and the vane shaft 53 free to rotate. The lower vane shaft 53 is shown with the locking wedge 69 securely pressed into the vane shaft cross slot 68 since fluid pressure has been applied to the fluid cylinder 47. Note that the lower vane 52 is locked in the closed position to flow passage position as the normal situation that occurs when the brake and lock fluid cylinder 47 has fluid pressure applied to it. That is the condition that occurs if there is a failure of power to the vane drive motor. This very simple vane braking and locking system has an extremely fast response rate and can brake and lock a vane 52 in less than a second.

FIG. 16 presents a cross sectional view, as taken through line 16—16 of FIG. 15, that shows the preferred method of stopping rotation of the braking wedge 69. The braking wedge or cam 69, or an anti-rotation pin or the like, simply slides in an anti-rotation slot 71 in housing 56.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. A fluid flow control means to reduce in magnitude water wave generated pressure pulses in a pressurized supporting gas cushion of an air cushion marine vehicle, said pressurized supporting gas cushion supplied with pressurized gas by gas pressurization means, comprising:

multiple high aspect ratio fluid flow control vanes that are substantially symmetrical about their rotational axes, said high aspect ratio fluid flow control vanes being individually driven by and axially in line with a vane drive motor, said high aspect ratio fluid flow control vanes at least partially disposed in a fluid flow path in fluid communication with the pressurized supporting gas cushion of said air cushion marine vehicle whereby rotational motion of said high aspect ratio fluid flow control vanes results in alternative, at least partial, openings and closings of said fluid flow path; and an individual braking and locking device for one of said high aspect ratio fluid flow control vanes that is capable of braking and locking said high aspect ratio fluid flow control vane in a fixed position.

2. The fluid flow control means of claim 1 wherein said high aspect ratio vane drive motor is a brushless electric motor.

3. The fluid flow control means of claim 1 wherein said high aspect ratio fluid flow control vane can rotate through three hundred and sixty degrees in either direction.

4. The fluid flow control means of claim 1 wherein said individual braking and locking device brakes and then locks the high aspect ratio fluid flow control vane in a position that at least partially closes off gas flow through said fluid flow path if power to a high aspect ratio vane drive motor is lost.

5. The fluid flow control means of claim 1 which further comprises a venturi positioned between said gas pressurization means and the pressurized supporting gas cushion of said air cushion marine vehicle.

6. The venturi of claim 5 wherein said venturi has a substantially rectangular cross-section.

7. The fluid flow control means of claim 1 wherein said high aspect ratio fluid flow control vane comprises a vane center shaft that extends outward on either side of said vane.

8. The fluid flow control means of claim 7 wherein said vane center shaft is divided.

9. The fluid flow control means of claim 1 wherein said high aspect ratio fluid flow control vane comprises a vane element where said vane element is inset into a vane center shaft.

10. The fluid flow control means of claim 1 wherein operation of said fluid flow control means is directed by a controller, said controller receives an electrical signal from a pressure transducer that is generated by the pressure transducer in response to pressure pulses in the pressurized supporting gas cushion, and said controller utilizes the electrical signal as a basis for control of positioning of the high aspect ratio fluid flow control vane.

11. A fluid flow control means to reduce in magnitude water wave generated pressure pulses in a pressurized supporting gas cushion of an air cushion marine vehicle, said pressurized supporting gas cushion supplied with pressurized gas by gas pressurization means, comprising:

said fluid flow control means at least partially disposed in a fluid flow path in fluid communication with the pressurized supporting gas cushion of said air cushion marine vehicle, in which operation of said fluid flow control means results, by rotational motion of a rotatably mounted vane, in alternative, at least partial, openings and closings of said fluid flow path, and said fluid flow control means having a braking and locking device that brakes and then locks the fluid flow control means in a position that at least partially closes off gas flow through said fluid flow path if power to a drive means for said fluid flow control means is lost and said braking and locking device comprises a resiliently biased member that prevents engagement of the braking and locking device when the braking and locking device is off.

12. The fluid flow control means of claim 11 wherein said braking and locking device comprises an open end slot in a fluid flow control means vane shaft with said open end slot mating with an at least partially wedge shaped braking and locking element when said braking and locking device is applied.

13. The fluid flow control means of claim 11 wherein said braking and locking device is at least partially energized by gas pressurization means.

14. The fluid flow control means of claim 11 wherein said braking and locking device comprises a resiliently biased pneumatic cylinder.

15. The fluid flow control means of claim 11 wherein fluid flow control is at least partially accomplished by a high aspect ratio fluid flow control vane.

16. The fluid flow control means of claim 15 wherein said high aspect ratio fluid flow control vane is substantially symmetrical about a rotational axis of said high aspect ratio fluid flow control vane.

17. The fluid flow control means of claim 16 wherein said high aspect ratio fluid flow control vane can rotate through three hundred and sixty degrees in either direction.

18. The fluid flow control means of claim 11 which further comprises a ventri positioned between said gas pressurization means and the pressurized supporting gas cushion of said air cushion marine vehicle.

19. A fluid flow control means to reduce in magnitude water wave generated pressure pulses in a pressurized supporting gas cushion of an air cushion marine vehicle, said pressurized supporting gas cushion supplied with pressurized gas by gas pressurization means, comprising:

said fluid flow control means at least partially disposed in a fluid flow path in fluid communication with the pressurized supporting gas cushion of said air cushion marine vehicle, in which operation of said fluid flow control means, by rotational motion of a rotatably mounted vane, results in alternative, at least partial, openings and closings of said fluid flow path, and said gas pressurization means having a venturi positioned between said gas pressurization means and the pressurized supporting gas cushion of said air cushion marine vehicle.

20. The venturi of claim 19 wherein said venturi has a substantially rectangular cross-section.

21. The fluid flow control means of claim 19 wherein fluid flow control is at least partially accomplished by a high aspect ratio fluid flow control vane.

22. The fluid flow control means of claim 21 wherein said high aspect ratio fluid flow control vane can rotate through three hundred and sixty degrees in either direction.

23. The fluid flow control means of claim 21 which further comprises a braking and locking device that brakes and then locks the high aspect ratio fluid flow control vane in a position that at least partially closes off gas flow through said fluid flow path if power to a drive means for said high aspect fluid flow control vane is lost.

24. A fluid flow control means to reduce in magnitude water wave generated pressure pulses in a pressurized supporting gas cushion of an air cushion marine vehicle, said pressurized supporting gas cushion supplied with pressurized gas by gas pressurization means, comprising:

a high aspect ratio fluid flow control vane that is substantially symmetrical about a rotational axis of said high aspect ratio fluid flow control vane, said high aspect ratio fluid flow control vane at least partially disposed in a fluid flow path in fluid communication with the pressurized supporting gas cushion of said air cushion marine vehicle, rotation of said high aspect ratio fluid flow control vane results in alternative, at least partial, openings and closings of said fluid flow path, and said high aspect ratio fluid flow control vane comprising a vane center shaft and lightweight vane elements that extend outward on either side of said vane center shaft and a venturi positioned between said gas pressurization means and the pressurized supporting gas cushion of said air cushion marine vehicle.

25. The high aspect ratio fluid flow control vane of claim 24 which further comprises a weld fixedly attaching said vane center shaft to said lightweight vane elements.

26. The fluid flow control means of claim 24 wherein said vane center shaft is divided.

27. The fluid flow control means of claim 24 wherein said high aspect ratio fluid flow control vane is rotated by an electric motor.

28. The fluid flow control means of claim 24 wherein said high aspect ratio fluid flow control vane further comprises means to create turbulence over portions of its surface on its upstream side in the flow path thereby at least partially equalizing fluid pressure forces on either side of a rotational centerline of the high aspect ratio fluid flow control vane and reducing said high aspect ratio fluid flow control vane's rotational force requirements.

29. The fluid flow control means of claim 24 wherein said high aspect ratio fluid flow control vane can rotate through three hundred and sixty degrees in either direction.

30. The fluid flow control means of claim 24 which further comprises a braking and locking device that brakes and then locks the high aspect ratio fluid flow control vane in a position that at least partially closes off gas flow through said fluid flow path if power to a drive means for said high aspect ratio fluid flow control vane is lost.

31. A fluid flow control means to reduce in magnitude water wave generated pressure pulses in a pressurized supporting gas cushion of an air cushion marine vehicle, said pressurized supporting gas cushion supplied with pressurized gas by gas pressurization means, comprising:

a high aspect ratio fluid flow control vane that is substantially symmetrical about its rotational axis, said high aspect ratio fluid flow control vane at least partially disposed in a fluid flow path in fluid communication with the pressurized supporting gas cushion of said air cushion marine vehicle;

a vane center shaft for rotational motion of the high aspect ratio fluid flow control vane in mechanical communication with said high aspect ratio fluid flow control vane, and where said high aspect ratio fluid flow control vane is inset into the vane center shaft, whereby rotational motion of said fluid flow control vane results in alternative, at least partial, openings and closings of said fluid flow path.

32. The fluid flow control means of claim 31 wherein said high aspect ratio fluid flow control vane is rotated by an electric motor.

33. The high aspect ratio fluid flow control vane of claim 31 which further comprises means to create turbulence over portions of its surface on its upstream side in the flow path thereby at least partially equalizing fluid pressure forces on either side of a rotational centerline of the high aspect ratio fluid flow control vane and reducing said high aspect ratio fluid flow control vane's rotational force requirements.

34. The fluid flow control means of claim 31 which further comprises a braking and locking device that brakes and then locks the high aspect ratio fluid flow control vane in a position that at least partially closes off gas flow through said fluid flow path if power to a drive means for said high aspect ratio fluid flow control vane is lost.

35. The fluid flow control means of claim 31 which further comprises a venturi positioned between said gas pressurization means and the pressurized supporting gas cushion of said air cushion marine vehicle.

36. The venturi of claim 35 wherein said venturi has a substantially rectangular cross-section.

37. The fluid flow control means of claim 31 wherein said high aspect ratio fluid flow control vane at least partially comprises the vane center shaft and lightweight vane elements that extend outward on either side of said vane center shaft.

38. The fluid flow control means of claim 31 wherein the vane center shaft is divided.

39. The fluid flow control means of claim 31 wherein said high aspect ratio fluid flow control vane comprises a vane element wherein said vane element at least partially pierces a vane center shaft.

40. The fluid flow control means of claim 31 wherein operation of said fluid flow control means is directed by a controller, said controller receives an electrical signal from a pressure transducer that is generated by the pressure transducer in response to pressure pulses in the pressurized supporting gas cushion, and said controller takes a mathematical derivative of the pressure signal by use of a differentiator circuit and uses the output of the differentiator circuit, a signal that is proportional to a rate of change of pressure in the pressurized supporting gas cushion, at a signal to base control of positioning of the high aspect ratio fluid flow control vane.

* * * * *